(12) United States Patent
Choi et al.

(10) Patent No.: US 7,700,031 B2
(45) Date of Patent: Apr. 20, 2010

(54) MOLD FOR INJECTION MOLDING AND MOLDING METHOD USING THE SAME

(75) Inventors: Duck Su Choi, Suwon-si (KR); Sang Bae Lee, Suwon-si (KR); Im Bong Park, Ansan-si (KR); Rae Hak Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 11/842,474

(22) Filed: Aug. 21, 2007

(65) Prior Publication Data

US 2008/0099959 A1    May 1, 2008

(30) Foreign Application Priority Data

Oct. 25, 2006  (KR) ................ 10-2006-0104056

(51) Int. Cl.
*B29C 45/27*    (2006.01)
(52) U.S. Cl. ............... 264/334; 425/556; 425/573
(58) Field of Classification Search .......... 264/334; 425/556, 567, 573
See application file for complete search history.

(56) References Cited

U.S. PATENT DOCUMENTS

| | | | | |
|---|---|---|---|---|
| 2,379,971 A | * | 7/1945 | Krehbiel | ............. 249/95 |
| 6,887,419 B2 | * | 5/2005 | Payette et al. | .......... 264/328.9 |

FOREIGN PATENT DOCUMENTS

| | | | |
|---|---|---|---|
| JP | 10-095033 A | | 4/1998 |
| JP | 2001-300984 | * | 10/2001 |
| JP | 2002-283418 | * | 10/2002 |
| JP | 2004-148783 | * | 5/2004 |

* cited by examiner

*Primary Examiner*—Jill L Heitbrink
(74) *Attorney, Agent, or Firm*—Sughrue Mion, PLLC

(57) ABSTRACT

A mold for injection molding and a molding method using the same, in which multiple gates are provided to a curved runner, thereby easily molding a product having a complicated shape and a large width, and in which a plurality of curved runners are provided, thereby easily ejecting forms that are filled in the runners. The mold includes first and second molds defining a mold cavity, a first gate disposed at a first position of the mold cavity, a second gate disposed at a second position of the mold cavity spaced apart from the first position, a first curved runner provided to the second mold so as to be connected to the first gate, and a second curved runner provided to the second mold so as to be connected to the second gate. The first and second curved runners have inlets that are connected with each other, and cross-sectional areas that are gradually reduced from the inlets to the first and second gates.

13 Claims, 6 Drawing Sheets

MOLD FOR INJECTION MOLDING AND MOLDING METHOD USING THE SAME

CROSS-REFERENCE TO RELATED APPLICATIONS

This application claims priority from Korean Patent Application No. 2006-104056, filed on Oct. 25, 2006, in the Korean Intellectual Property Office, the disclosure of which is incorporated herein by reference.

BACKGROUND OF THE INVENTION

1. Field of the Invention

Apparatuses and methods consistent with the present invention relate generally to a mold for injection molding and, more particularly, to a mold for injection molding having a plurality of curved runners, and a molding method using the same.

2. Description of the Prior Art

A mold for injection molding has a runner for guiding molten resin fed through a sprue into a mold cavity for molding a product. In this case, an exit of the runner is called a gate. In the case where the gate is located on the outer surface of a molded product, a mark of the gate remains on the outer surface of the molded product, and thus it is difficult to provide an aesthetically pleasing external appearance. As such, the mold, which is disclosed in Japanese Patent Application Publication No. Hei 10(1998)-95033, employs a curved runner capable of providing a gate to the rear surface of a molded product.

The mold disclosed in this document includes a first runner provided at a parting portion of a stationary mold and a movable mold, and a second curved runner connecting a mold cavity with the first runner. The second runner has an arcuate shape, and a cross-sectional area that is gradually reduced from an entry connected with the first runner to a gate.

This mold can prevent the mark of the gate from remaining on the outer surface (i.e., front surface) of the molded product because the gate of the second runner is located on the rear surface of the molded product. Further, when the movable mold is separated from the stationary mold, the molded product can be separated from the gate of the second runner, and a form of the resin filled in the second runner can be separated from the mold while being elastically deformed.

This mold makes it possible to mold a product having a simple shape and a small size. However, because the gate is located only at a limited position of the mold cavity, the mold can be subjected to a short run of the molten resin when a thin, wide, flat product or a tortuous product is molded. In the case of the mold employing the curved runner, it is difficult to construct multiple gates due to the difficulty in removing a form in the runner in the future.

SUMMARY OF THE INVENTION

Accordingly, exemplary embodiments of the present invention have been made to address above-mentioned problems occurring in the prior art, and an aspect of the present invention is to provide a mold for injection molding and a molding method using the same, in which multiple gates are provided to a curved runner, thereby easily molding a product having a complicated shape and a large width.

It is another aspect of the present invention to provide a mold for injection molding and a molding method using the same, in which a plurality of curved runners are provided, thereby easily ejecting forms in the runners.

According to an aspect of the present invention, there is provided a mold for injection molding, which includes a first mold and a second mold defining a mold cavity, a first gate disposed at a first position of the mold cavity, a second gate disposed at a second position of the mold cavity spaced apart from the first position, a first curved runner provided to the second mold so as to be connected to the first gate, and a second curved runner provided to the second mold so as to be connected to the second gate. The first and second curved runners have inlets that are connected with each other, and cross-sectional areas that are gradually reduced from the inlets to the first and second gates.

In this case, the mold may further include a connecting runner, which is provided at a parting portion between the first mold and the second mold and is connected with the inlets of the first and second curved runners.

Further, the mold may further include at least one first ejector pin for separating a resin form that is filled in the connecting runner, and at least one second ejector pin for separating a product molded in the mold cavity.

Also, the first and second curved runners may be filled with respective resin forms, which are separated together when the resin form that is filled in the connecting runner is separated.

Furthermore, the mold may further include an operating plate that operates the first and second ejector pins at the same time.

Meanwhile, the second mold may include a runner mold in which the first and second curved runners are formed.

Further, the first curved runner may have a radius different from that of the second curved runner.

According to another aspect of the present invention, there is provided a molding method using a mold for injection molding, in which the mold includes first and second molds defining a mold cavity, a first gate disposed at a first position of the mold cavity, a second gate disposed at a second position of the mold cavity spaced apart from the first position, a first curved runner provided to the second mold so as to be connected to the first gate, a second curved runner provided to the second mold so as to be connected to the second gate and having an inlet connected with an inlet of the first curved runner, at least one first ejector pin for separating resin forms in the first and second curved runners, and at least one second ejector pin for separating a product. The molding method includes the steps of injecting molten resin into the mold cavity through the first and second curved runners and molding the product, separating the first and second molds from each other, and separating the resin forms that are filled in the first and second runners using the first ejector pin, and separating the product using the second ejector pin.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EXEMPLARY EMBODIMENTS OF THE INVENTION

Hereinafter, exemplary embodiments of the present invention will be described in detail with reference to the accompanying drawings.

Figure 1:
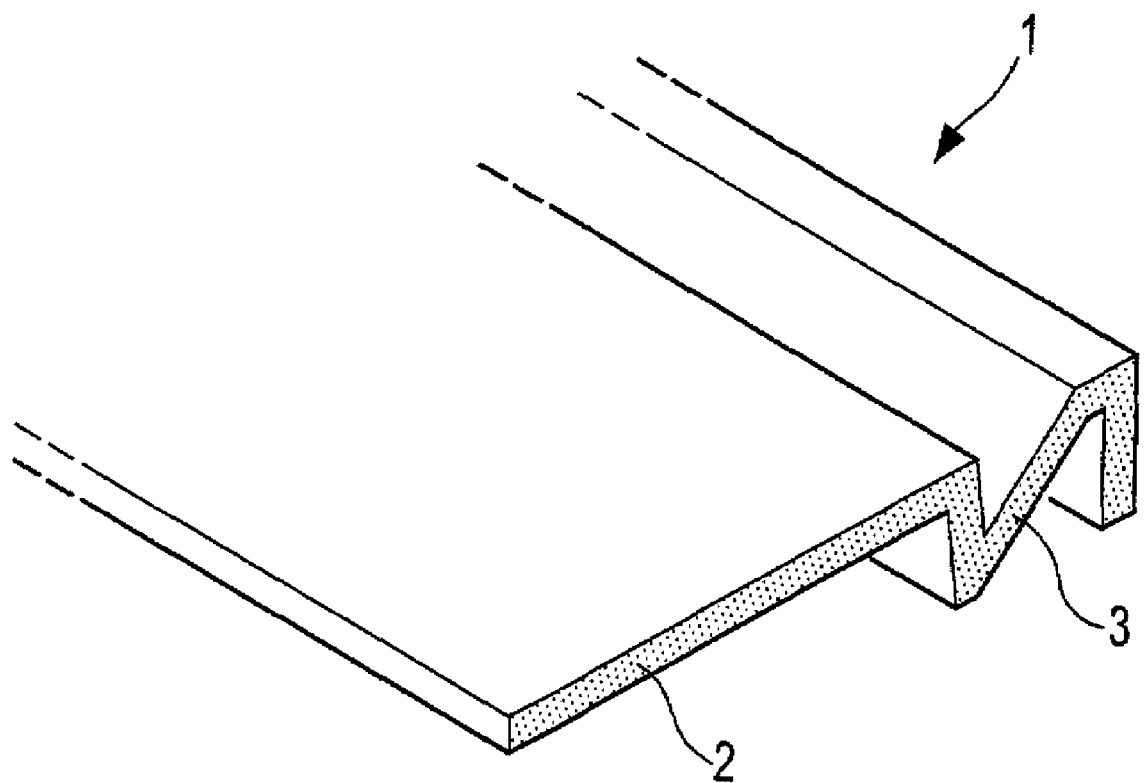
FIG. 1 is a perspective view illustrating a product molded by a mold consistent with the present invention.

FIG. 1 illustrates a product molded by a mold consistent with the present invention. The molded product 1 has a wide flat section 2, and a curved section 3 that integrally extends from the wide flat section 2, and has a zigzag cross section.

Figure 2:
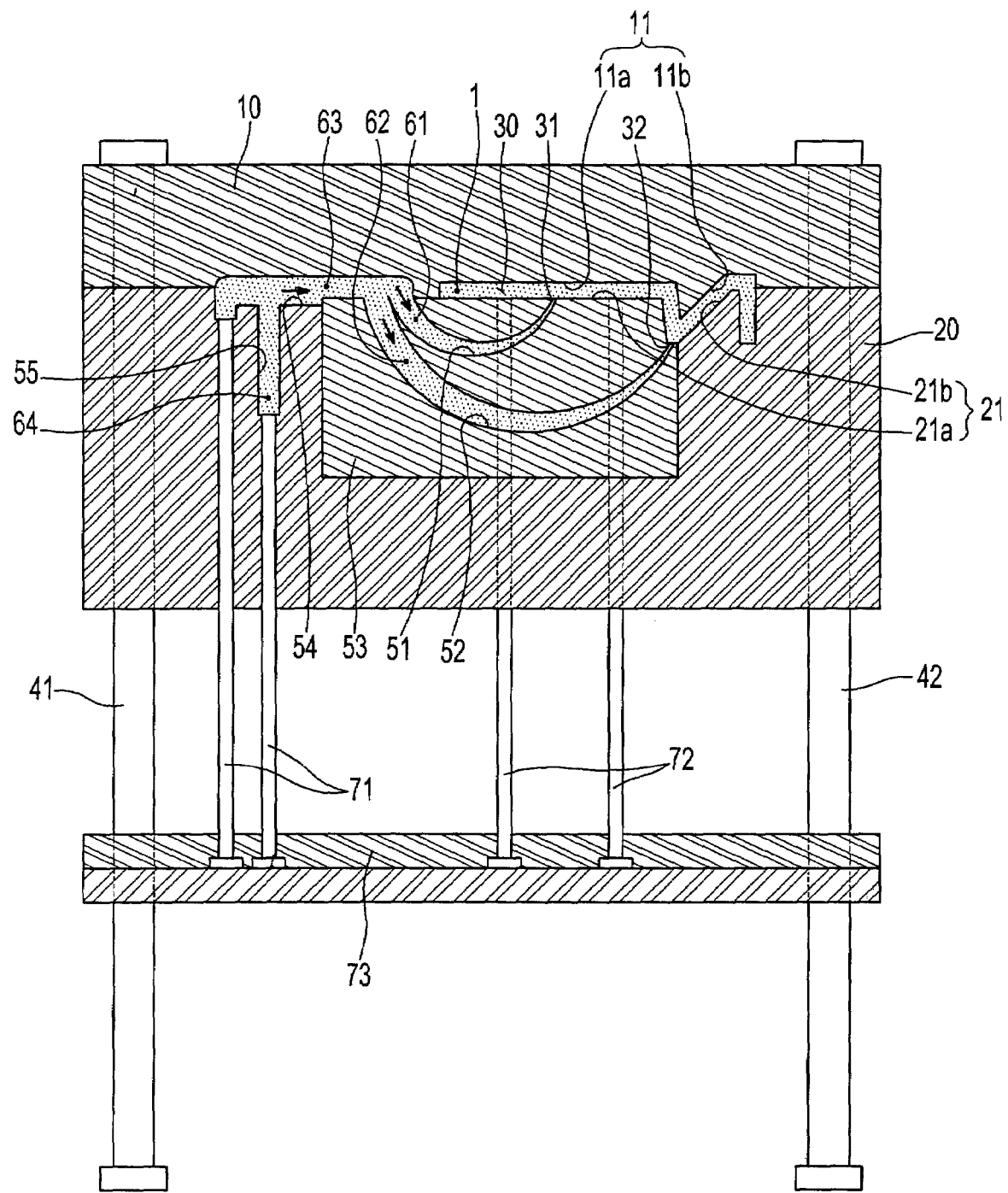
FIG. 2 is a sectional view illustrating a mold for injection molding consistent with the present invention, wherein a first mold is joined with a second mold.
Figure 3:
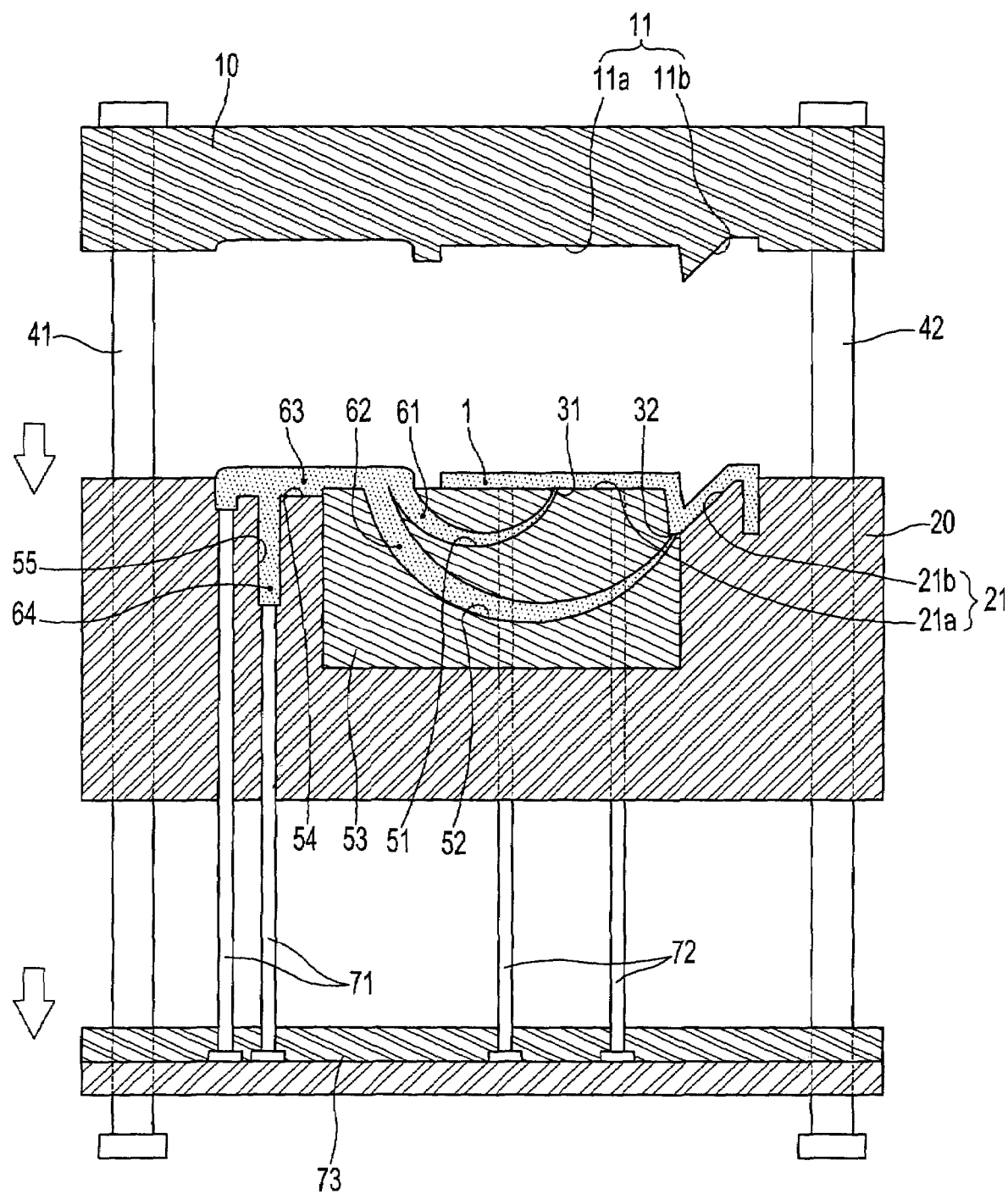
FIG. 3 is a sectional view illustrating a mold for injection molding consistent with the present invention, wherein a first mold is separated from a second mold.
Figure 4:
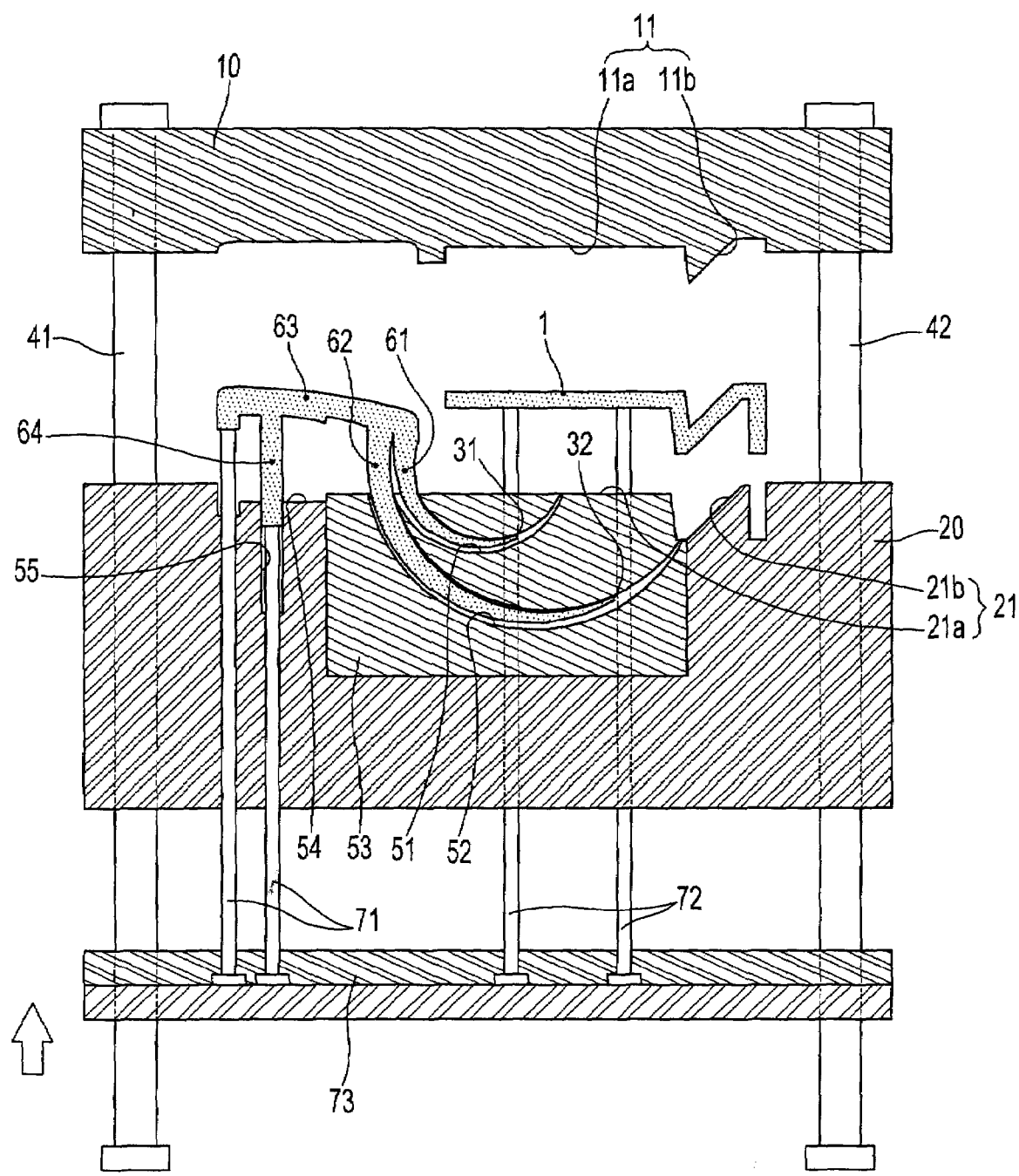
FIG. 4 is a sectional view illustrating a mold for injection molding consistent with the present invention, wherein resin forms that are filled in corresponding runners are separated together with a molded product.

As illustrated in FIGS. 2, 3 and 4, a mold for molding this product 1 includes a first upper mold 10 and a second lower mold 20, which are joined to define a mold cavity 30. The first upper mold 10 maintains a stationary state, and the second lower mold 20 is installed to move up and down along guide rods 41 and 42.

The first upper mold 10 is provided, on a lower surface thereof, with an upper surface molding part 11 defining an upper surface of the mold cavity 30. The second lower mold 20 is provided, on an upper surface thereof, with a lower surface molding part 21 defining a lower surface of the mold cavity 30. The upper and lower surface molding parts 11 and 21 include flat molding surfaces 11a and 21a for molding the flat section 2 of the product 1, and curved molding surfaces 11b and 21b for molding the curved section 3 of the product 1, respectively.

The lower surface molding part 21 of the second lower mold 20 is provided with first and second gates 31 and 32, which are spaced apart from each other in order to inject molten resin into the mold cavity. The first gate 31 is located on the side of the flat molding surface 21a, and the second gate 32 is located on the side of the curved molding surface 21b. This construction allows the molten resin to be injected into the mold cavity 30 at different positions, so that the product 1 can be easily molded in spite of its complicated shape.

The second lower mold 20 includes a first curved runner 51 for feeding the molten resin to the first gate 31, and a second curved runner 52 for feeding the molten resin to the second gate 32. In the case of the mold illustrated in FIG. 2, the first and second runners 51 and 52 are formed in a separate runner mold 53 that is coupled to the second lower mold 20. Alternatively, the first and second runners 51 and 52 may be directly formed in the second lower mold 20.

Figure 5:
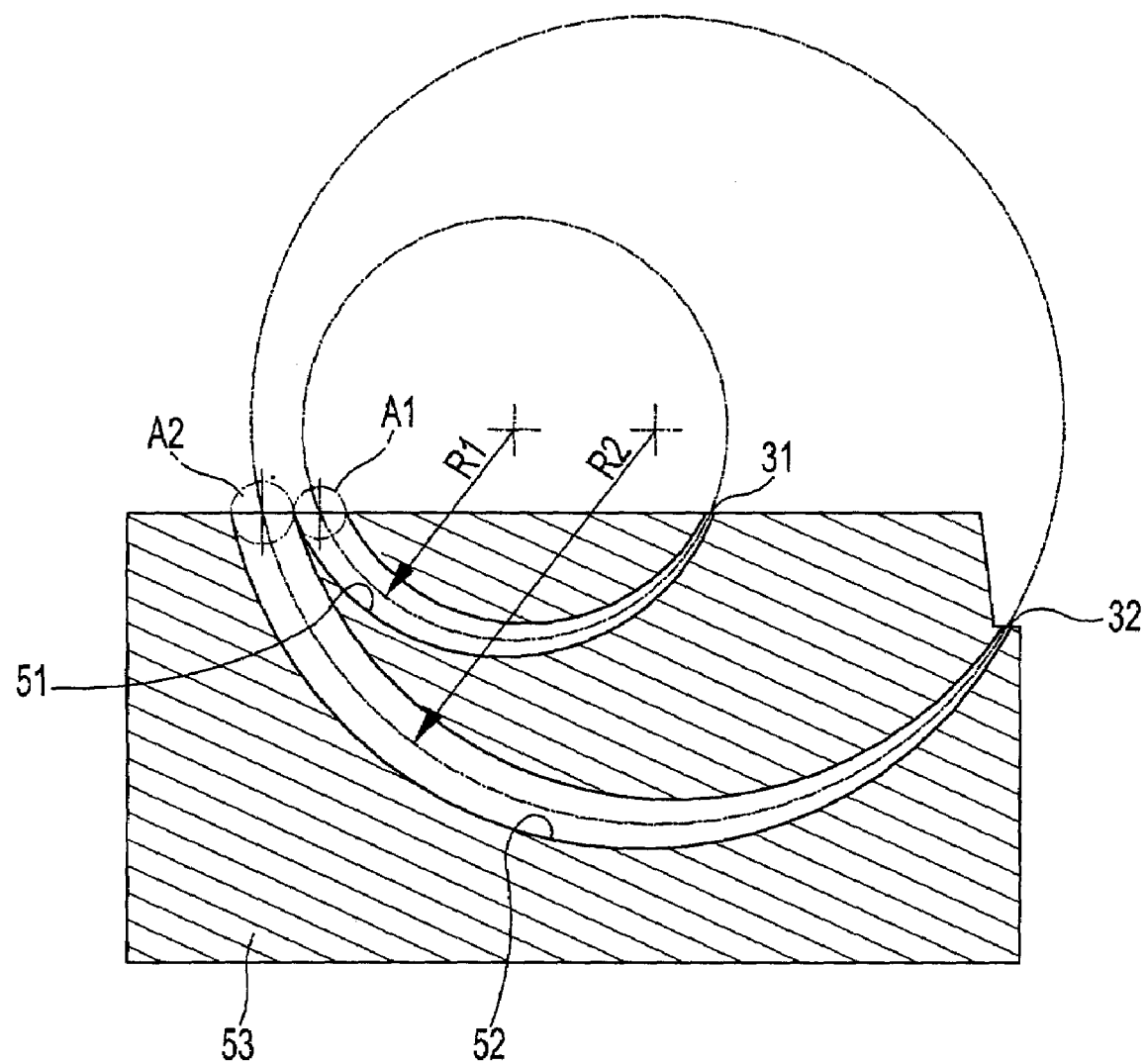
FIG. 5 is a sectional view illustrating a layout structure of first and second runners in a mold for injection molding consistent with the present invention.

As illustrated in FIG. 5, each of the first and second runners 51 and 52 has an arcuate shape. The first runner 51 has a radius R1 smaller than that of R2 of the second runner 52. Further, the first and second runners 51 and 52 have inlets connected to each other, and have cross-sectional areas gradually reduced from the inlets to the first and second gates 31 and 32, respectively. The inlet cross-sectional area A1 of the first runner 51 is smaller than that of A2 of the second runner 52.

With this construction, the molten resin can be smoothly fed to the first and second gates 31 and 32, and simultaneously resin forms 61 and 62 that are filled in the first and second runners 51 and 52 can be easily separated from the first and second runners 51 and 52. Further, the inlets of the first and second runners 51 and 52 are connected to each other, and the resin forms 61 and 62 that are filled in the first and second runners 51 and 52 are cured in connection with each other, so that the resin forms 61 and 62 of the first and second runners 51 and 52 can be separated together from the first and second runners 51 and 52.

A parting portion between the first upper mold 10 and the second lower mold 20 is provided with a connecting runner 54 connected with the inlets of the first and second runners 51 and 52. Although not illustrated in the figures, the connecting runner 54 guides the molten resin fed through a sprue to the inlets of the first and second runners 51 and 52.

Further, the mold of the present invention includes a plurality of first ejector pins 71 for separating a resin form 63 that is filled in the connecting runner 54, a plurality of second ejector pins 72 for separating the molded product 1 from the mold cavity 30, and an operating plate 73 for operating the first and second ejector pins 71 and 72 at the same time.

The first and second ejector pins 71 and 72 are installed to vertically pass through the second lower mold 20, and coupled to the liftable operating plate 73 at lower ends thereof. The first ejector pins 71 of the second lower mold 20 communicate with the connecting runner 54 at upper ends thereof. At least one of the upper ends of the first ejector pins 71 is provided with a long cylindrical resin injection cavity 55 in a longitudinal direction thereof. This allows an ejection guide 64 to be integrally formed with the resin form 63 in the connecting runner 54 by means of the resin injected into the resin injection cavity 55. As illustrated in FIG. 4, the ejection guide 64 guides the resin form 63 in the connecting runner 54 so as to be pushed upward by a predetermined distance when the first ejector pins 71 move upwards, so that it can be ejected together with the resin forms 61 and 62 of the first and second runners 51 and 52 which are integrally formed with the resin form 63 in the connecting runner 54.

An operation of this mold and a molding method using this mold will now be described.

As illustrated in FIG. 2, when molten resin is injected toward the connecting runner 54 after the first upper mold 10 is joined with the second lower mold 20, the molten resin is fed to the first and second gates 31 and 32 through the first and second runners 51 and 52. The resin fed to the first gate 31 mainly molds the flat section 2 of the product 1, and the resin fed to the second gate 32 mainly molds the curved section 3 of the product 1. In this manner, the molten resin is distributed to the first and second gates 31 and 32 through the first and second curved runners 51 and 52, so that the molten resin can be smoothly filled into the mold cavity 30 although the product 1 has a complicated shape.

As illustrated in FIG. 3, after the molten resin is completely filled in the mold cavity 30, the second lower mold 20 is separated from the first upper mold 10 in order to separate the molded product 1. At this time, the first upper mold 10 maintains a stationary state, while the second lower mold 20 moves downwards together with the operating plate 73.

As illustrated in FIG. 4, after the second lower mold 20 moves downwards, the second lower mold 20 maintains a stop state, and then the operating plate 73 moves upwards. Thereby, the first and second ejector pins 71 and 72 move upwards. Accordingly, the molded product 1 is separated from the second lower mold 20, and simultaneously the resin forms 61 and 62 in the first and second runners 51 and 52 are separated together with the resin form 63 in the connecting runner 54. At this time, the resin forms 61 and 62 in the first and second runners 51 and 52 are cut off at the first and second gates 31 and 32.

The resin forms 61 and 62 that are filled in the first and second runners 51 and 52 are shaped into arcs having different radiuses, and are integrally connected with the resin form 63 that is filled in the connecting runner 54 in interconnection with each other on the side having a large cross-sectional area, so that they can be easily separated by the upward movement of the first ejector pins 71. In other words, when the first ejector pins 71 move upwards, the ejection guide 64 pushes up the resin form 63 in the connecting runner 54 by a predetermined distance, and thus the resin forms 61 and 62 in the first and second runners 51 and 52 are pulled upwards by means of the upward movement of the resin form 63 in the connecting runner 54. As a result, the resin forms 61 and 62 in the first and second runners 51 and 52 are easily ejected outside while accompanied with slight elastic deformation.

Figure 6:
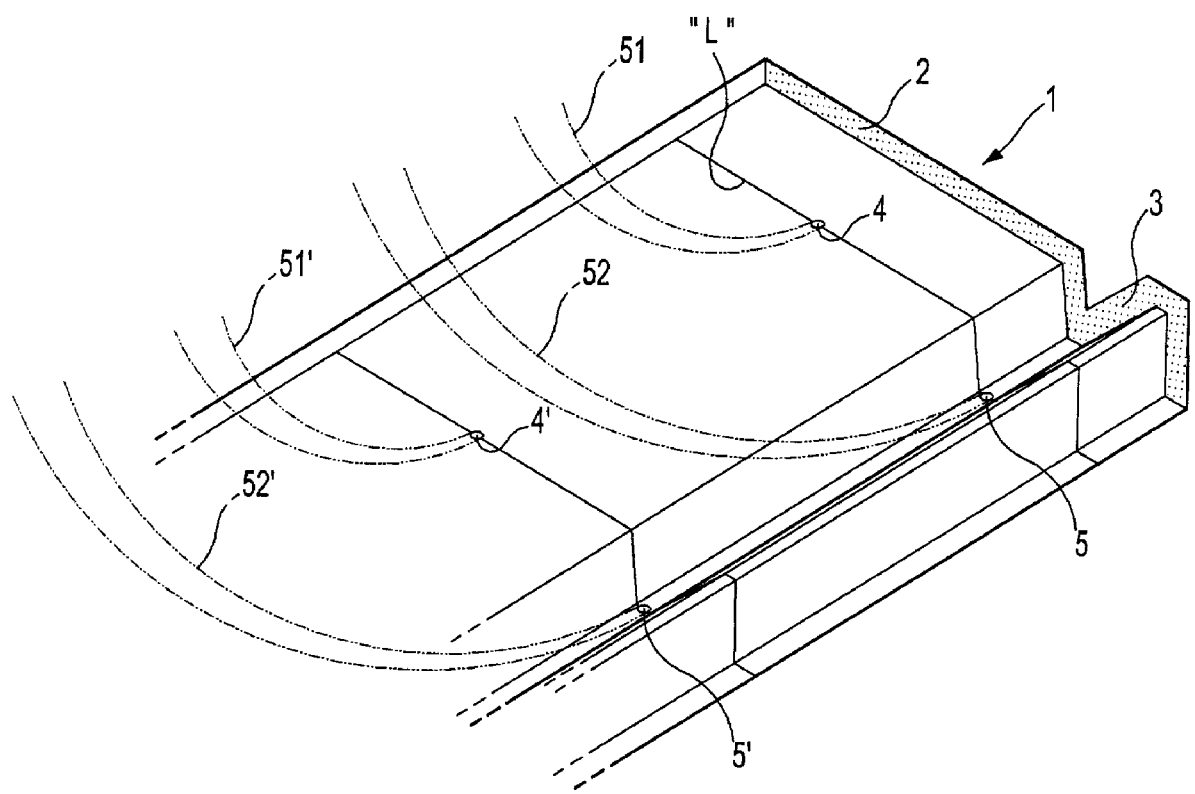
FIG. 6 is a perspective view illustrating a rear surface of a product molded by a mold consistent with the present invention.

As illustrated in FIG. 6, a mark 4 of the first gate 31 and a mark 5 of the second gate 32 are left on a rear surface of the molded product 1. In this manner, because these marks 4 and 5 exist on the rear surface of the molded product 1, a front surface of the molded product 1 can maintain an aesthetically pleasing external appearance. In order to smoothly eject the resin forms 61 and 62 in the first and second runners 51 and 52, the first and second gates 31 and 32 of the first and second runners 51 and 52 are located on the same line L, so that the marks 4 and 5 of the first and second gates 31 and 32 which are formed at the molded product 1 are located on the same line L. The example of FIG. 6 shows gate marks 4' and 5' formed by first and second runners 51' and 52' that are spaced apart from each other in a longitudinal direction of the molded product 1.

As described in detail above, the mold for injection molding consistent with the present invention can feed the molten resin to the first and second gates disposed at different positions of the mold cavity through the first and second curved runners, so that the product having a complicated shape and a large width can be easily molded.

Further, the resin forms that are filled in the first and second curved runners are connected with each other at the inlets of the curved runners, and are connected with the resin form that is filled in the connecting runner at the same time, so that the resin forms in all of the runners can be easily ejected from the mold at one time.

Although exemplary embodiments of the present invention have been described for illustrative purposes, those skilled in the art will appreciate that various modifications, additions and substitutions are possible, without departing from the spirit and scope of the invention as disclosed in the accompanying claims.

What is claimed is:

1. A molding method using a mold for injection molding, in which the mold includes first and second molds defining a mold cavity, a first gate disposed at a first position of the mold cavity, a second gate disposed at a second position of the mold cavity spaced apart from the first position, a first curved runner provided to the second mold so as to be connected to the first gate, a second curved runner provided to the second mold so as to be connected to the second gate and having an inlet connected with an inlet of the first curved runner, at least one first ejector pin for separating resin forms that are filled in the first and second curved runners, and at least one second ejector pin for separating a product, the molding method comprising:

injecting molten resin into the mold cavity through the first and second curved runners and molding the product;

separating the first and second molds from each other; and separating the resin forms that are filled in the first and second curved runners using the first ejector pin, and separating the product using the second ejector pin.

2. The molding method as claimed in claim 1, wherein the first and second ejector pins are simultaneously operated to separate the resin forms that are filled in the first and second curved runners together with the product.

3. The molding method as claimed in claim 1, wherein the resin forms in the first and second curved runners are separated by pushing the first ejector pin against a resin form that is filled in a connecting runner that is in communication with the inlet of the first curved runner and with the inlet of the second curved runner.

4. A mold for injection molding, the mold comprising:
a first mold and a second mold defining a mold cavity;
a first gate disposed at a first position of the mold cavity;
a second gate disposed at a second position of the mold cavity spaced apart from the first position;
a first curved runner provided to the second mold so as to be connected to the first gate; and
a second curved runner provided to the second mold so as to be connected to the second gate,
wherein the first and second curved runners have inlets that are connected with each other, and cross-sectional areas that are gradually reduced from the inlets to the first and second gates.

5. The mold as claimed in claim 4, further comprising a connecting runner that is provided at a parting portion between the first mold and the second mold, and is connected with the inlets of the first and second curved runners.

6. The mold as claimed in claim 5, further comprising at least one first ejector pin for separating a resin form that is filled in the connecting runner, and at least one second ejector pin for separating a product molded in the mold cavity.

7. The mold as claimed in claim 6, wherein the first and second curved runners have respective resin forms that are separated together when the resin form that is filled in the connecting runner is separated.

8. The mold as claimed in claim 6, further comprising an operating plate that operates the first and second ejector pins at the same time.

9. The mold as claimed in claim 4, wherein the second mold includes a runner mold in which the first and second curved runners are formed.

10. The mold as claimed in claim 4, wherein the first curved runner has a radius different from that of the second curved runner.

11. The mold as claimed in claim 4, wherein the first runner has a radius smaller than a radius of the second runner, and a cross-sectional area of the inlet of the first runner is smaller than a cross-sectional area of the inlet of the second runner.

12. The mold as claimed in claim 4, wherein the first curved runner extends along a plane and the second curved runner extends along the same plane as the first curved runner.

13. The mold as claimed in claim 12, wherein the first curved runner and the second curved runner are disposed on a same side of the inlets relative to one another.

* * * * *